C. EASTBURN.
Cultivator.
No. 24,203.
Patented May 31, 1859.
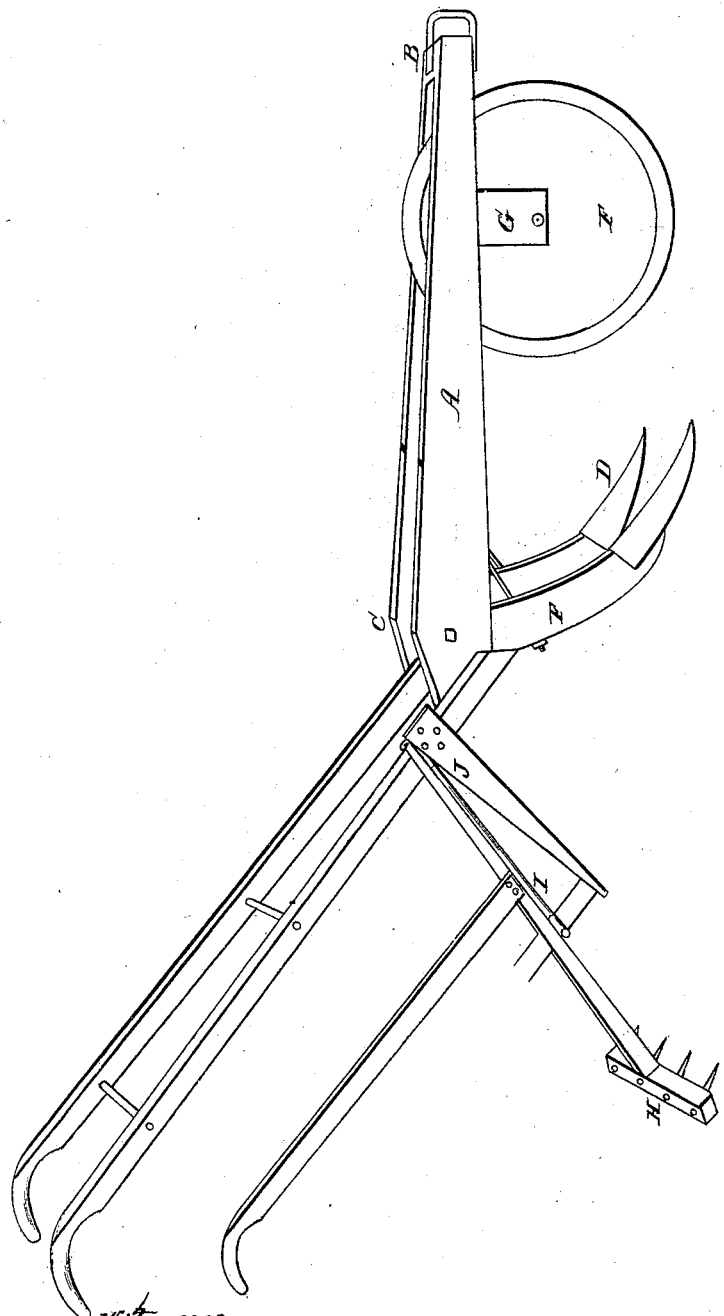
Witnesses
Inventor
Celestin Eastburn

UNITED STATES PATENT OFFICE.

C. EASTBURN, OF SPENCER COUNTY, KENTUCKY.

IMPROVEMENT IN CULTIVATORS.

Specification forming part of Letters Patent No. 24,203, dated May 31, 1859.

*To all whom it may concern:*

Be it known that I, CELESTIN EASTBURN, in the county of Spencer and State of Kentucky, have invented a new and useful Improvement on the Bull-Tongue Plow; and I do hereby declare that the following is a full, clear, and exact description of the construction and operation of the same, reference being had to the annexed drawing, making a part of this specification.

To enable others to make and use my invention, I will proceed to describe its construction and operation.

I make my beams (shown at A) four feet four inches long, four inches wide where the helve passes through, and two and one-fourth inches thick, tapered to one and a half inches wide at the nose, and same thickness. I connect the beams A together at the nose by a block of wood eight inches wide and seven inches long, as shown at B, by passing a bolt through the beams and block. I connect the same at the heel by a rod of iron one foot apart, as shown at C. Consequently the plows shown at D stand eleven inches apart from the center of one point to the other. I make my plows D fourteen inches long, five inches wide at top, three inches wide at the points, and half inch thick, of iron or steel, bolted to circular helves, fourteen inches long, as shown at E. I insert a wheel eighteen inches in diameter and two inches thick, as shown at F, by passing knees through the beams A seven inches long and three inches wide. (Shown at G.) I attach a spring-rake (shown at H) to the right-hand handle by a block of wood and steel spring (shown at I and J) by passing strong wood-screws through the block and handle—the block J one foot long, two inches wide, and one and a fourth inch thick, and the spring ten inches long.

The operation is as follows: I first use the machine as a seed-coverer. In this operation the wheel F is indispensably necessary. The rake H is taken off, it being of no use in seed-covering.

When I am done using the machine as a seed-coverer I remove the wheel F by drawing out the knees G, and attach the rake H for the purpose of raking clods or trash of any kind that may lodge about the young plants, which is easily done by the plowman springing the rake H down as he passes along without stop or hindrance. The rake is supported eight inches above the ground by the spring, and works on a space of eighteen inches horizontal, making it convenient to strike anywhere necessary.

After the plants are large enough to stand against the clods and trash I take off the rake H by removing the block J.

I also use the machine in putting in small grain, it answering the better for that purpose than any other plow in use. It leaves the ground smooth and covers the grain sufficiently deep, and is done with more speed and convenience than by any other plan.

What I claim as my invention, and desire to secure by Letters Patent, is—

The arrangement of the plows D, wheel F, back J, spring I, and rake H, as set forth and described, for the purposes specified.

CELESTIN EASTBURN.

Witnesses:
WM. S. GIVENS,
BENJ. P. WIGGINTON.